May 10, 1938.   H. D. DEE   2,116,880
SELF LOCKING CABLE HOOK
Filed Aug. 27, 1935   2 Sheets-Sheet 2
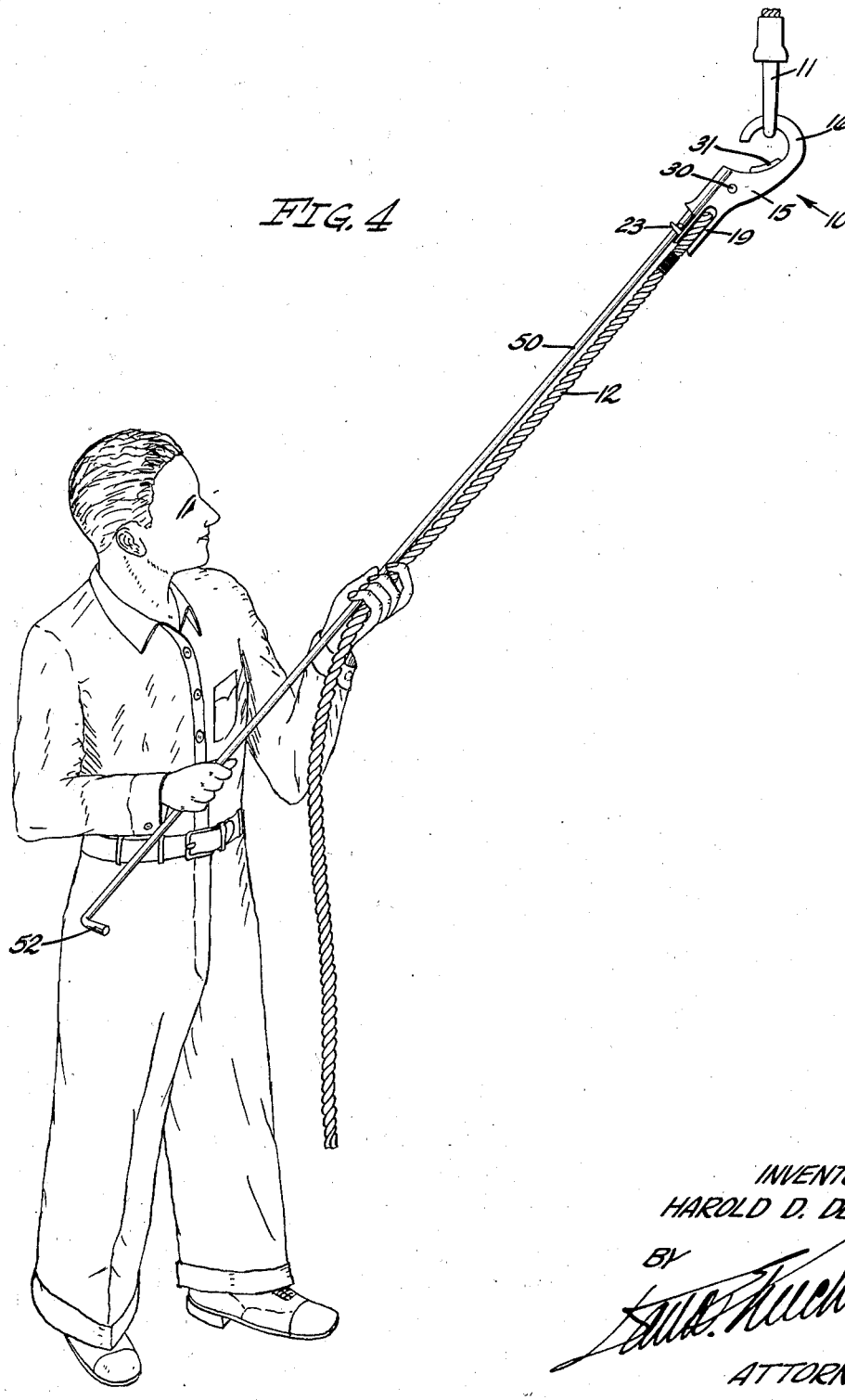
INVENTOR
HAROLD D. DEE
BY
ATTORNEY Patented May 10, 1938

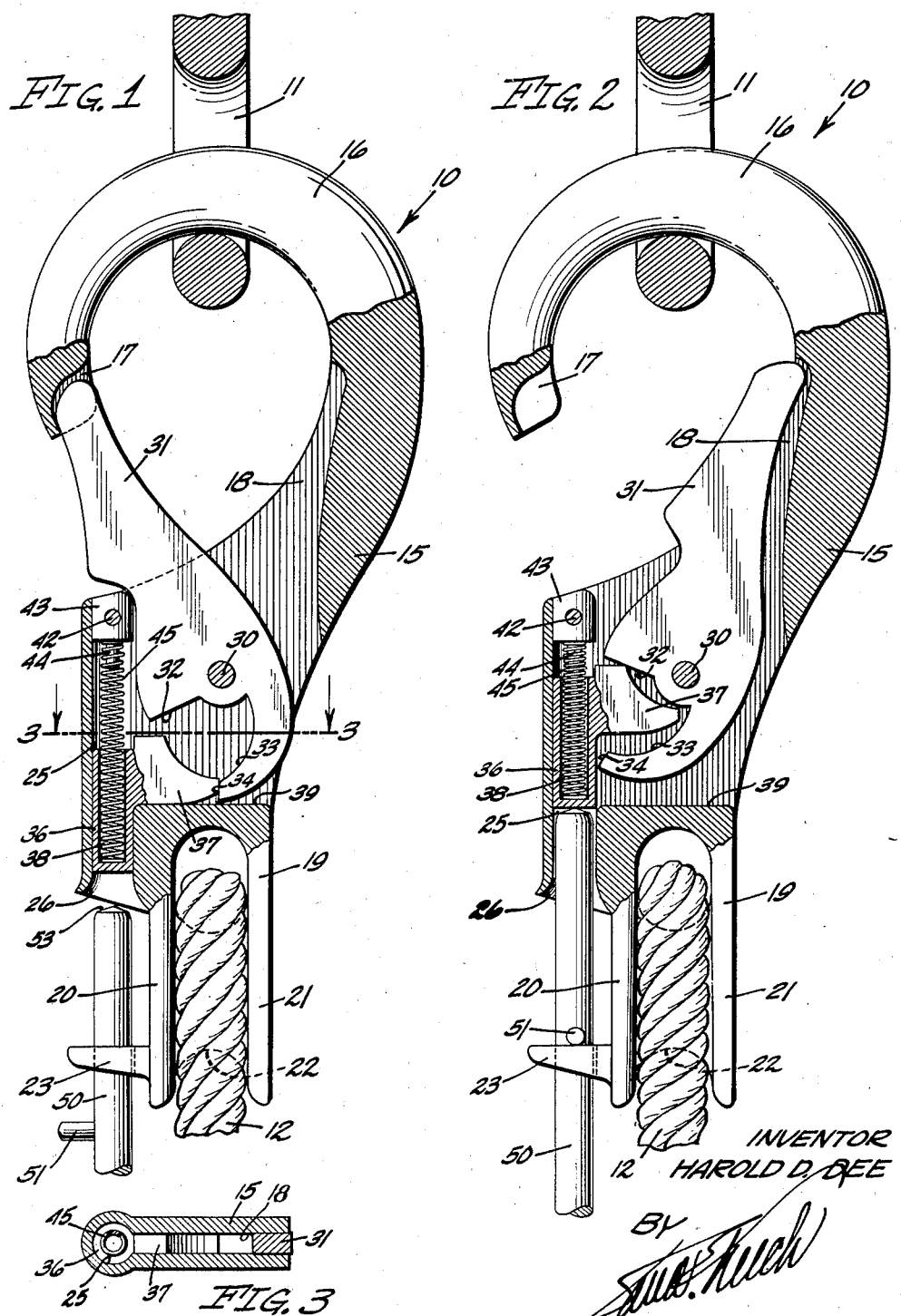

2,116,880

UNITED STATES PATENT OFFICE 2,116,880

SELF LOCKING CABLE HOOK

Harold D. Dee, Los Angeles, Calif.

Application August 27, 1935, Serial No. 38,046

4 Claims. (Cl. 114—230)

My invention relates to cable hooks, and has for one of its objects the provision of a self-locking cable hook for use in mooring boats and in making cable connections for various industrial purposes.

It is also an object of the invention to provide such a self-locking cable hook which cannot become accidentally unlocked.

As cable hooks must often be inserted in place at a distance from the operator, it is a further object of the invention to provide such a hook which may easily be locked and unlocked from a distance.

It is a still further object of the invention to provide such a self-locking cable hook which can be easily handled by the operator while being locked, unlocked and placed in or removed from hooking position.

The manner of accomplishing the foregoing objects as well as further objects and advantages will be made manifest in the following description taken in connection with the accompanying drawings in which:

Fig. 1 is a side elevational view of a preferred embodiment of the hook of my invention partially broken away to illustrate the construction thereof this view showing the latch in closed and locked position.

Fig. 2 is a view similar to Fig. 1 with the latch in opened position and with the key rod retained in unlocking position so as to permit the hook to be handled by manipulation of the key rod.

Fig. 3 is a detailed cross sectional view taken on the line 33 of Fig. 1.

Fig. 4 is a perspective view illustrating the manner of handling the hook of my invention when the key rod is inserted into the hook and retained in place therein.

Referring specifically to the drawings, it will be noted that I have illustrated a self-locking cable hook 10, which constitutes a preferred embodiment of my invention as associated with a supporting ring 11, for the purpose of connecting to this ring a cable 12.

The hook 10 includes a body 15, having a hook horn 16, the latter having a latch-receiving recess 17 at its extremity. The body 15 provides an internal latch recess 18, a cable eye 19 having flanges 20 and 21 and a cable securing hub 22. Provided above the flanges 20 is a rod guide yoke 23, the purpose of which will be made manifest hereinafter. The body 15 also provides an internal guideway 25, the upper portion of which communicates with the recess 18 and the lower end of which (as viewed in the drawings) communicates with the exterior of the body 15 in a flared mouth 26.

Pivotally mounted in the recess 18 on a pin 30, which extends through the body 15, is a hook-latch 31, which is adapted to swing about the pin 30 between the closed position shown in Fig. 1 and the open position shown in Fig. 2. The lower end of the latch 31 is so formed as to provide an opening surface 32, a closing surface 33, and a locking surface 34.

Slidable in the guideway 25 is a lock-member 36 on which is provided a dog 37, which extends into operative relation with the surfaces 32, 33, and 34 as will be explained hereinafter. The member 36 also has an internal bore 38. When the member 36 is in a downward-most position the dog 37 rests against a shoulder 39 provided by the body 15 at the lower end of the recess 18, thus preventing further downward movement of the member 36.

Extending into the upper end of the guideway 25 and secured in place by a pin 42, is a plug 43 having a spring stem 44. Centered on the stem 44 and extending into the bore 38 is an expansion spring 45, the function of which is to move the member 36 downwardly, thereby causing the dog 37 to engage the latch-closing surface 33 and bring the latch into closed position as shown in Fig. 1, after which the dog 37 continues downward into engagement with the locking surface 34 on the latch 31, thereby locking the latter in such closed position.

The hook 10 of my invention is adapted to be locked, unlocked and handled by a key-rod 50 which is provided with a retaining pin 51 on its upper end and with a handle 52 on its lower end. The upper extremity of the rod 50 is provided with a point 53.

Operation

The hook 10 of my invention is adapted to be connected with a ring such as the ring 11, which is out of reach of the operator. To accomplish this the operator inserts the key-rod 50 through the yoke 23 and into the guideway 25 until this causes the latch 31 to be retracted as shown in Fig. 2. At this time the pin 51 is disposed upwardly above the yoke 23, whereupon the rod 50 is rotated by the handle 52 so that the pin 51 comes to rest over the yoke 23 as shown in Fig. 2. The rod 50 is sufficiently near the internal diameter of the guideway 25 that when inserted therein as shown in Fig. 2 the rod 50 becomes a temporary handle for the hook 10. When thus temporarily connected to the hook, the rod 50 may be manipulated so as to position the hook wherever desired. As shown in Fig. 4, the rod 50 may be used to connect the hook 10 with the ring 11. It is of course to be understood that the rod 50 may be used without the pin 51, in which case the cable 12 is held with the rod in the hands of the operator so as to maintain the rod 50 in the guideway 25, during the handling of the hook on the end of the rod.

When the hook has been placed in position as shown in Fig. 4 the operator merely rotates the rod 50 by the handle 52 so as to turn the pin 51 away from over the yoke 23, thus permitting the spring 45 to shift the member 36 downwardly and eject the rod from the guideway 25. This of course closes the latch 31 and locks it in closed position. The hook 10 now is free from the rod 50 which can be laid aside until it is again desired to disconnect the hook 10 from the ring 11. When it is desired to do this and the cable 12 is slack, the operator takes this cable in his hands as shown in Fig. 4, and holding the hook 10 pulled toward him, the operator pushes the pointed end 53 of the rod 50 through the yoke 23 and into the guideway 25 and then rotates the rod 50 so that the latch 31 is not only opened but that the hook 10 is temporarily locked onto the outer end of the rod 50. It is now possible by manipulation of the rod 50 to remove the hook 10 from the ring 11.

It is thus seen that I have provided a self-locking cable hook, the locking means of which is relatively inaccessible, thereby preventing accidental disconnecting of the hook from the ring to which it is attached. It is also apparent that I have provided such a hook which can be readily unlocked and removed from or engaged with a ring or the like to which it is desired to temporarily connect the cable so that the cable may not be accidentally detached.

While I have shown but a single embodiment of my invention, it is to be understood that various changes may be made in this without departing from the spirit of the invention or the scope of the appended claims.

I claim as my invention:

1. In a self-locking cable hook the combination of: a body; a hook horn provided on said body; a hook latch pivotally mounted on said body; lock means on said body for locking said latch in closed position; spring means actuating said lock means and normally urging said lock means to lock said latch in closed position; and readily separable key means for counteracting said spring means so as to shift said lock means to unlock said latch and shift the latter to open position, said key means serving as a temporary handle for said hook while said latch is unlocked.

2. In a self locking cable hook the combination of: a body; a hook horn provided on said body; a hook latch pivotally mounted on said body; lock means on said body for locking said latch in closed position, said lock means being concealed within said body and operable to release and open said latch, there being an opening in said body providing access of key means to said lock; spring means actuating said lock means and normally urging said lock means to lock said latch in closed position; and readily separable key means for counteracting said spring means so as to shift said lock means to unlock said latch and shift the latter to open position, said key means serving as a temporary handle for said hook while said latch is unlocked.

3. In a self locking cable hook the combination of: a body having a hook horn, a cable eye, an internal latch receiving recess, and an enclosed lock guide communicating with said recess at an upper portion thereof and with the exterior of said body at the lower end thereof; a hook latch pivotally mounted on said body in said recess, said latch having latch opening, latch closing, and latch locking surfaces; a lock member slidable in said guideway; a dog on said member extending into said recess into operative relation with said latch surfaces; said dog preventing the discharge of said lock member from the lower end of said guideway; and an expansion spring in said guideway urging said lock member downward, said dog thereupon closing said latch and locking it closed, said member being operable to unlock and open said latch by the insertion of a rod upwardly into the lower end of said guideway.

4. A combination as in claim 3 in which key rod guide means are provided upon said body for guiding a key rod into said guideway; a key rod having a handle at one end; and means at the opposite end of said rod for engagement with said hook body to temporarily retain said rod in inserted position in said slideway in which said latch is held open by said dog.

HAROLD D. DEE.